US011304197B2

United States Patent
Zachrison et al.

(10) Patent No.: US 11,304,197 B2
(45) Date of Patent: Apr. 12, 2022

(54) NETWORK NODE AND METHOD FOR DECIDING REMOVAL OF A RADIO RESOURCE ALLOCATED TO A UE

(71) Applicant: Telefonaktiebolaget LM Ericsson (publ), Stockholm (SE)

(72) Inventors: Mats Zachrison, Örebro (SE); Raimundas Gaigalas, Hässelby (SE); Jonas Wiorek, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 8 days.

(21) Appl. No.: 16/954,819

(22) PCT Filed: Dec. 20, 2017

(86) PCT No.: PCT/SE2017/051315
§ 371 (c)(1),
(2) Date: Jun. 17, 2020

(87) PCT Pub. No.: WO2019/125247
PCT Pub. Date: Jun. 27, 2019

(65) Prior Publication Data
US 2021/0100000 A1 Apr. 1, 2021

(51) Int. Cl.
*H04W 72/04* (2009.01)
*H04W 24/08* (2009.01)
(52) U.S. Cl.
CPC ....... *H04W 72/0486* (2013.01); *H04W 24/08* (2013.01)
(58) Field of Classification Search
CPC ... H04W 28/085; H04W 28/26; H04W 24/08; H04W 76/15; H04W 47/562; H04W 72/10; H04W 36/02; H04W 28/0289
(Continued)

(56) References Cited

U.S. PATENT DOCUMENTS 7,710,922 B2 * 5/2010 Lundh ................... H04W 36/02
370/331
9,386,594 B2 * 7/2016 Liu ......................... H04W 72/10
(Continued)

FOREIGN PATENT DOCUMENTS

EP 2 299 753 A1 3/2011
EP 3729854 A1 * 10/2020 ............ H04W 24/08
(Continued)

OTHER PUBLICATIONS

QoS Aware Predictive Radio Resource Management Approach Based on MIH Protocol by Khitem Ben Ali • Faouzi Zarai • Radhia Khdhir • Mohammad S. Obaidat • Lotfi Kamoun Published in: IEEE Systems Journal (vol. 12, Issue: 2, pp. 1862-1873) Feb. 2018 (Year: 2018).*

(Continued)

*Primary Examiner* — William D Cumming
(74) *Attorney, Agent, or Firm* — Rothwell, Figg, Ernst & Manbeck, P.C.

(57) ABSTRACT

A method performed by a network node for managing a radio resource between the network node and a first User Equipment, in a wireless communications network is provided. The network node serves a number of UEs, comprising the first UE and one or more second UEs. The first UE has a radio resource allocated for communication between the first UE and the network node. The network node estimates (203) a prediction of a forthcoming empty data flow related to the allocated radio resource, based on a measured data flow between the network node and the first UE. The network node further determines (205) a threshold related to the prediction, based on a measured data flow between the network node and the number of UEs. The network node then decides (206) whether or not to initiate a (Continued)

removal of the radio resource allocated to the first UE based on whether or not the prediction exceeds the threshold.

16 Claims, 11 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 9,722,892 | B2* | 8/2017 | Yoshida | H04L 41/142 |
| 9,973,438 | B2* | 5/2018 | Johansson | H04L 47/562 |
| 10,674,403 | B2* | 6/2020 | Fu | H04W 28/085 |
| 2017/0111243 | A1* | 4/2017 | Bell | H04W 24/08 |
| 2018/0310203 | A1* | 10/2018 | Fu | H04W 76/15 |
| 2020/0322873 | A1* | 10/2020 | Zachrison | H04W 28/0289 |
| 2021/0022034 | A1* | 1/2021 | Zachrison | H04W 28/26 |
| 2021/0100000 | A1* | 4/2021 | Zachrison | H04W 24/08 |

FOREIGN PATENT DOCUMENTS

| | | | |
|---|---|---|---|
| WO | 03/005751 A1 | 1/2003 | |
| WO | 2008/148358 A1 | 12/2008 | |
| WO | WO-2019125247 A1 * | 6/2019 | H04W 24/08 |
| WO | WO-2019125250 A1 * | 6/2019 | H04W 72/0486 |

OTHER PUBLICATIONS

X. Ba, "QoS—Forecasting-Based Intelligent Flow-Control Scheme for Multi-Connectivity in 5G Heterogeneous Networks," in IEEE Access, vol. 9, pp. 104304-104315, Jan. 2021, doi: 10.1109/ACCESS.2021.3099824. (Year: 2021).*

International Search Report and Written Opinion issued in International Application No. PCT/EP2017/051315 dated May 22, 2018 (9 pages).

* cited by examiner

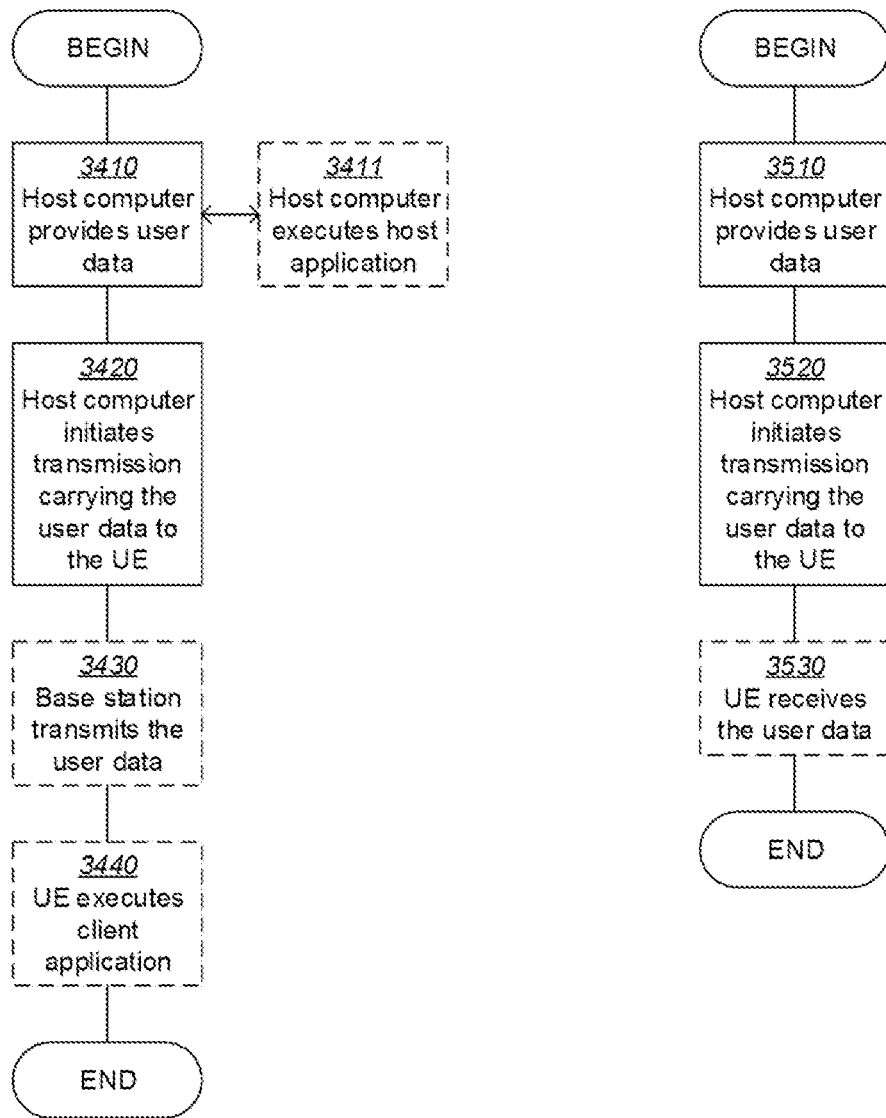

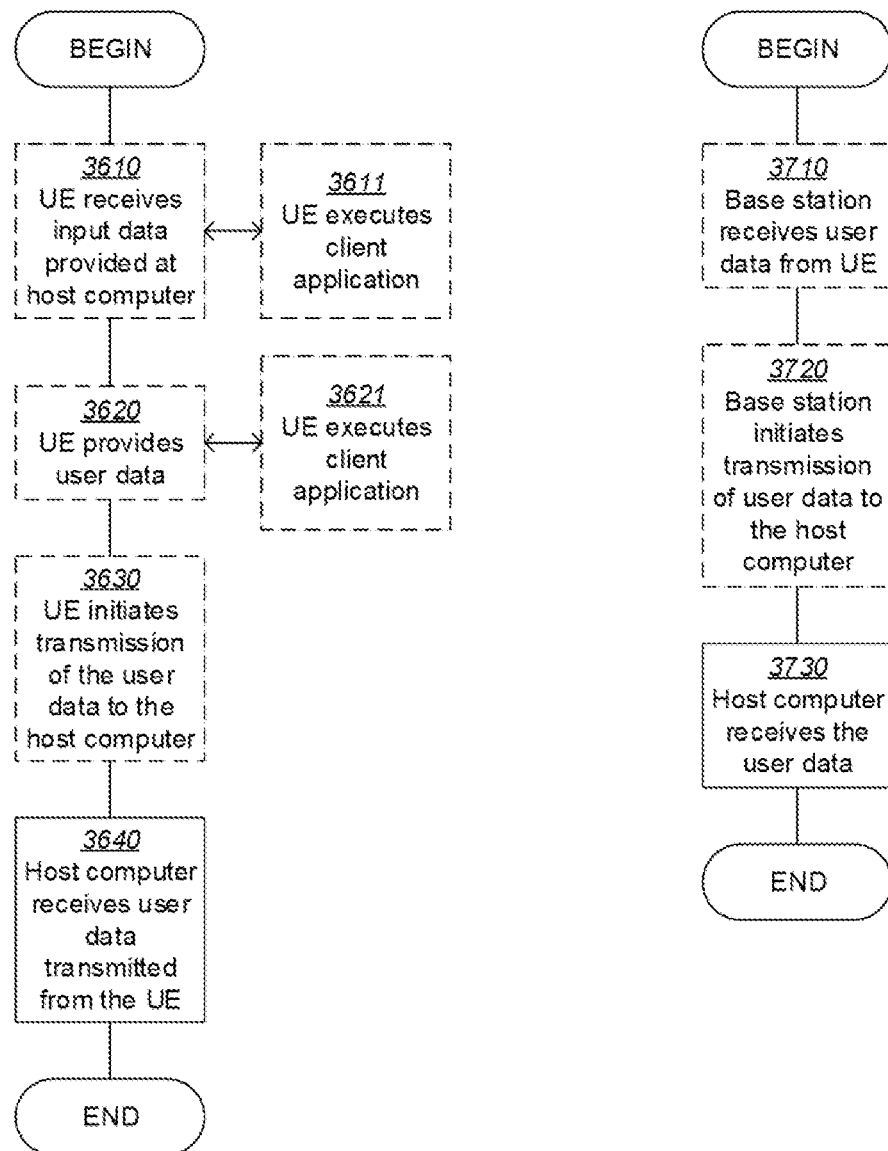

NETWORK NODE AND METHOD FOR DECIDING REMOVAL OF A RADIO RESOURCE ALLOCATED TO A UE

CROSS REFERENCE TO RELATED APPLICATION(S)

This application is a 35 U.S.C. § 371 National Stage of International Patent Application No. PCT/SE2017/051315, filed Dec. 20, 2017, designating the United States.

TECHNICAL FIELD

Embodiments herein relate to a network node and methods therein. In particular, they relate to managing a radio resource between the network node and a first User Equipment (UE) in a wireless communications network.

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Machine Learning (ML) is a field in computer science where a computer through algorithms and methods can be trained to learn certain patterns and their representation, so when confronted with similar data patterns the computer can take decisions related to the data, e g predictions, classifications, and actions.

Typical existing solutions to manage inactive mobile end users such as UEs are to e.g. release the UE, put it into power saving mode or remove network resources assigned to the UE. These methods are all monitoring the time since last activity to and from the UE. If no activity has occurred for a certain time the UE may be transferred to a power saving mode. If the time of inactivity is extended the UE may lose some of its allocated radio network resources. After a long time of inactivity, the UE may be released from the mobile network. Thus, this is a step based method to save resources, both in the network and in the UE, by monitoring the actual flow activity to and from the UE.

Traditional methods are time based and all UEs are treated equally in terms of usage and additional resources will in many cases be handed out to the wrong users such as e.g. to users with low capacity demand resulting in that they never utilize the full capacity of the additional resources.

SUMMARY

An object of embodiments herein is to improve the performance of a wireless communications network.

According to a first aspect of embodiments herein, the object is achieved by a method performed by a network node for managing a radio resource between a network node and a first User Equipment, UE, in a wireless communications network. The network node serves a number of UEs comprising the first UE and one or more second UEs. The first UE has a radio resource allocated for communication between the first UE and the network node. The network node estimates a prediction of a forthcoming empty data flow related to the allocated radio resource, based on a measured data flow between the network node and the first UE. The network node further determines a threshold related to the prediction, based on a measured data flow between the network node and the number of UEs. The network node then decides whether or not to initiate a removal of the radio resource allocated to the first UE based on whether or not the prediction exceeds the threshold.

According to a second aspect of embodiments herein, the object is achieved by a network node for managing a radio resource between the network node and a first User Equipment, UE, in a wireless communications network. The network node is adapted to serve a number of UEs comprising the first UE and one or more second UEs. The first UE is adapted to have a radio resource allocated for communication between the first UE and the network node. The network node is further configured to:

estimate a prediction of a forthcoming empty data flow related to the allocated radio resource, based on a measured data flow between the network node and the first UE, determine a threshold related to the prediction, based on a measured data flow between the network node and the number of UEs, and decide whether or not to initiate a removal of the radio resource allocated to the first UE based on whether or not the prediction exceeds the threshold.

Since the network node estimates a prediction of a forthcoming empty data flow related to the allocated radio resource, being based on a measured data flow between the network node and the first UE, and determines a threshold related to the prediction based on a measured data flow between the network and the number of UEs, and then decides whether or not to initiate a removal of the radio resource allocated to the first UE based on whether or not the prediction exceeds the threshold, the decision is performed dynamically based on current conditions, instead of being static. This will in turn improve the performance of a wireless communications network.

An advantage with embodiments herein is that they will improve the utilization rate of radio resources, both in the wireless communications network and in the UE, leading to better performance. Less resources will be wasted, the non-empty flows UEs are prioritized to the resources, and resources are removed from the empty flow UEs. Also, power consumption in the UE will be reduced.

BRIEF DESCRIPTION OF THE DRAWINGS

Examples of embodiments herein are described in more detail with reference to attached drawings in which:

FIGS. 10 to 13 are flowcharts illustrating methods implemented in a communication system including a host computer, a base station and a user equipment.

DETAILED DESCRIPTION

Figure 1:
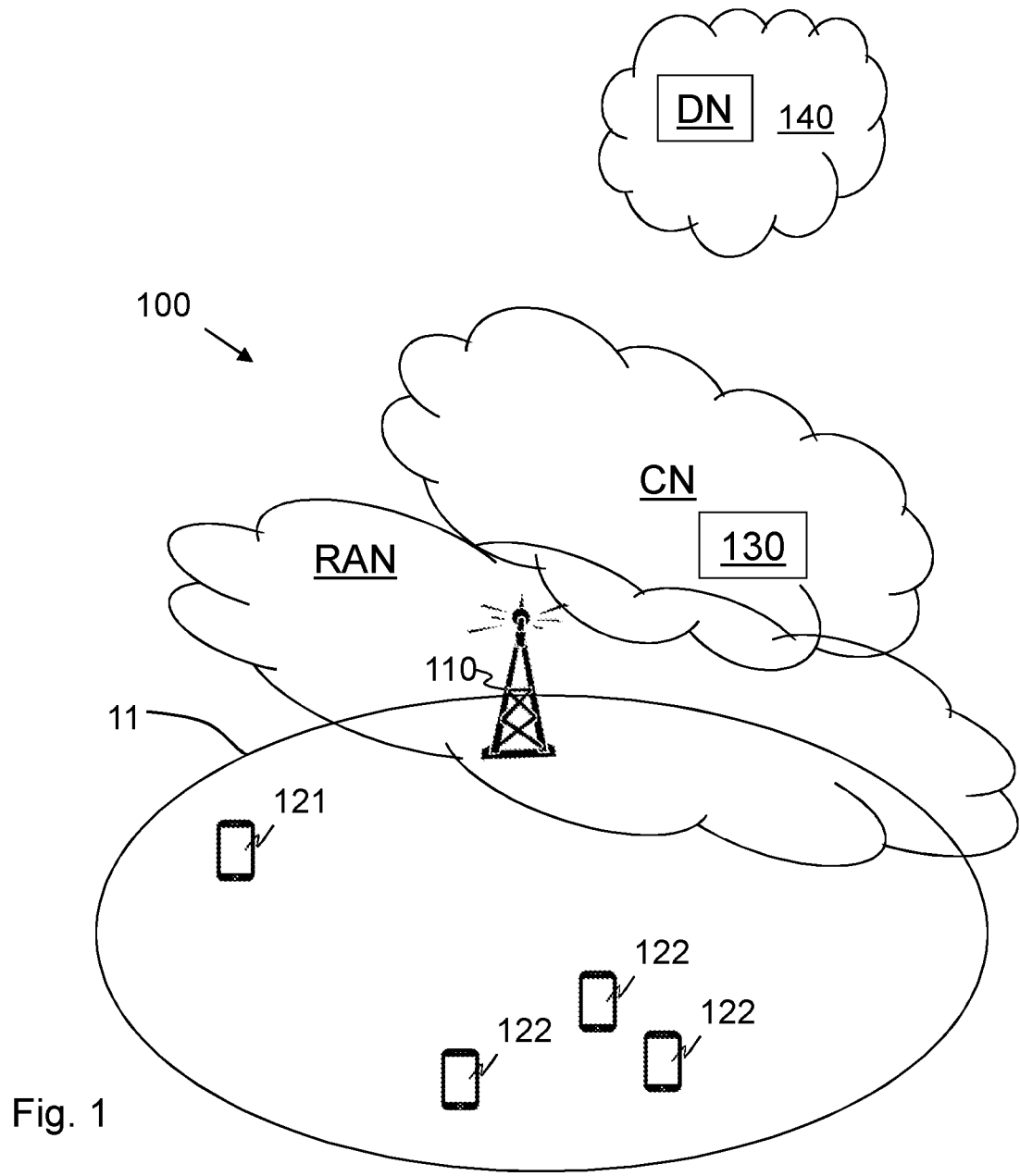
FIG. 1 is a schematic block diagram illustrating embodiments of a wireless communications network.

As a part of developing embodiments herein a problem will first be identified and discussed.

How to manage inactive UEs is a major factor for determining the efficiency of radio resource utilization, and hence a large part of the performance of a wireless communications system.

As mentioned above, traditional methods are time based. All users are treated equally in terms of radio resource usage and no adaptation to e g different traffic patterns is included. This means that a UE is not classified as inactive based on the predicted requirement, so additional radio resources will in many cases be handed out to wrong UEs.

In the same way, no radio resource needs are predicted for the remainder of the connection, so in a loaded scenario, UEs that will become active may instead be terminated or moved to less powerful resource levels.

In both cases the radio resources are not utilized efficiently and the performance of the wireless communications network will be suffering.

An ML model based static empty flow prediction per individual mobile end user or connected device is an existing solution to manage inactive mobile end users.

When using ML for empty flow prediction, the accuracy of the decisions is a highly vital characteristic, and traditional models do not include methods for improving accuracy during fluctuating conditions. When the ML model is used in a dynamic environment, more situation adapted schemes are needed to utilize the full potential of the method.

Thus as mentioned above, an object of embodiments herein is to improve the performance of a wireless communications network.

Embodiments herein provide empty flow prediction performed by a network node per individual UE or connected device e.g. by means of an ML model. In some embodiments of the method e.g. by means of an ML model in the network node. The prediction of the flow may be made at a certain point in time without having to rely on a timer to time out. If the prediction is made with high probability the decision may be to release the UE. If the prediction is less certain the decision may be to stay connected but remove resources allocated by the UE or send the UE to power saving mode.

In some embodiments of the method e.g. the method is used in conditions that may vary, wherein the requirements on the prediction accuracy over time may fluctuate. The network node such as its empty flow predictor may in these embodiments decide that a specific flow is non-empty and the flow will keep its allocated resources at one point in time but predicts the specific flow to be empty at a later time. Embodiments herein provide inherent characteristics of the individual predictions which are utilized to improve the performance for the measure over time with the highest momentary importance, and thereby attain a dynamic and timely behavior automatically adapting to various conditions over time of the execution environment.

Some embodiments herein introduces an empty flow prediction, such as an ML model based empty flow prediction, that will improve the utilization rate of radio resources, both in the wireless communications network and in the UE, leading to better performance. As mentioned above, less resources will be wasted, the non-empty flows UEs are prioritized to the resources, and resources are removed from the empty flow UEs. Also, the power consumption of the UEs will be reduced.

In some embodiments, a time based empty flow prediction is provided to adapt to changing conditions and optimize its performance in a dynamic way and over time. The adaptation handles varying conditions in an efficient way without any tuning or complex remodeling schemes involved. The embodiments are applicable for different models, various targets, and condition alterations of any kind.

Embodiments herein relate to wireless communication networks in general. FIG. 1 is a schematic overview depicting a wireless communications network 100. The wireless communications network 100 comprises one or more RANs and one or more CNs. The wireless communications network 100 may use NR but may further use a number of other different technologies, such as, 5G, NB-IoT, CAT-M, Wi-Fi, eMTC, Long Term Evolution (LTE), LTE-Advanced Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

Network nodes operate in the wireless communications network 100, such as a network node 110, providing radio coverage over a geographical area, a cell 11. The cell 11 may also be referred to as a service area, beam or a group of beams.

The network node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (VVLAN) access point or an Access Point Station (AP STA), an access controller, or any other network unit capable of communicating with a UE within the cell 11 served by the network node 110 depending e.g. on the radio access technology and terminology used. The network node 110 may be referred to as a serving radio network node and communicates with a UE 121, 122 with Downlink (DL) transmissions to the UE 121, 122 and Uplink (UL) transmissions from the UE 121, 122.

UEs such as e.g. a first UE 121 and one or more second UEs 122 operate in the wireless communications network 100. The UEs 121, 122 may e.g. be a mobile station, a wireless terminal, an NB-IoT device, an eMTC device, a CAT-M device, a WiFi device, an LTE device and an a non-access point (non-AP) STA, a STA, that communicates via a base station such as e.g. the network node 110, one or more Access Networks (AN), e.g. RAN, to one or more core networks (CN). It should be understood by the skilled in the art that "UE" is a non-limiting term which means any terminal, wireless communication terminal, user equipment, Device to Device (D2D) terminal, or node e.g. smart phone, laptop, mobile phone, sensor, relay, mobile tablets or even a small base station communicating within a cell.

Further network nodes operate in the wireless communications network 100, such as a network node 130. The network node 130 may be an MME which is a control node for an LTE access network and an NR network, an Serving Gateway (SGVV), and a Packet Data Network Gateway (PGW).

Figure 4:
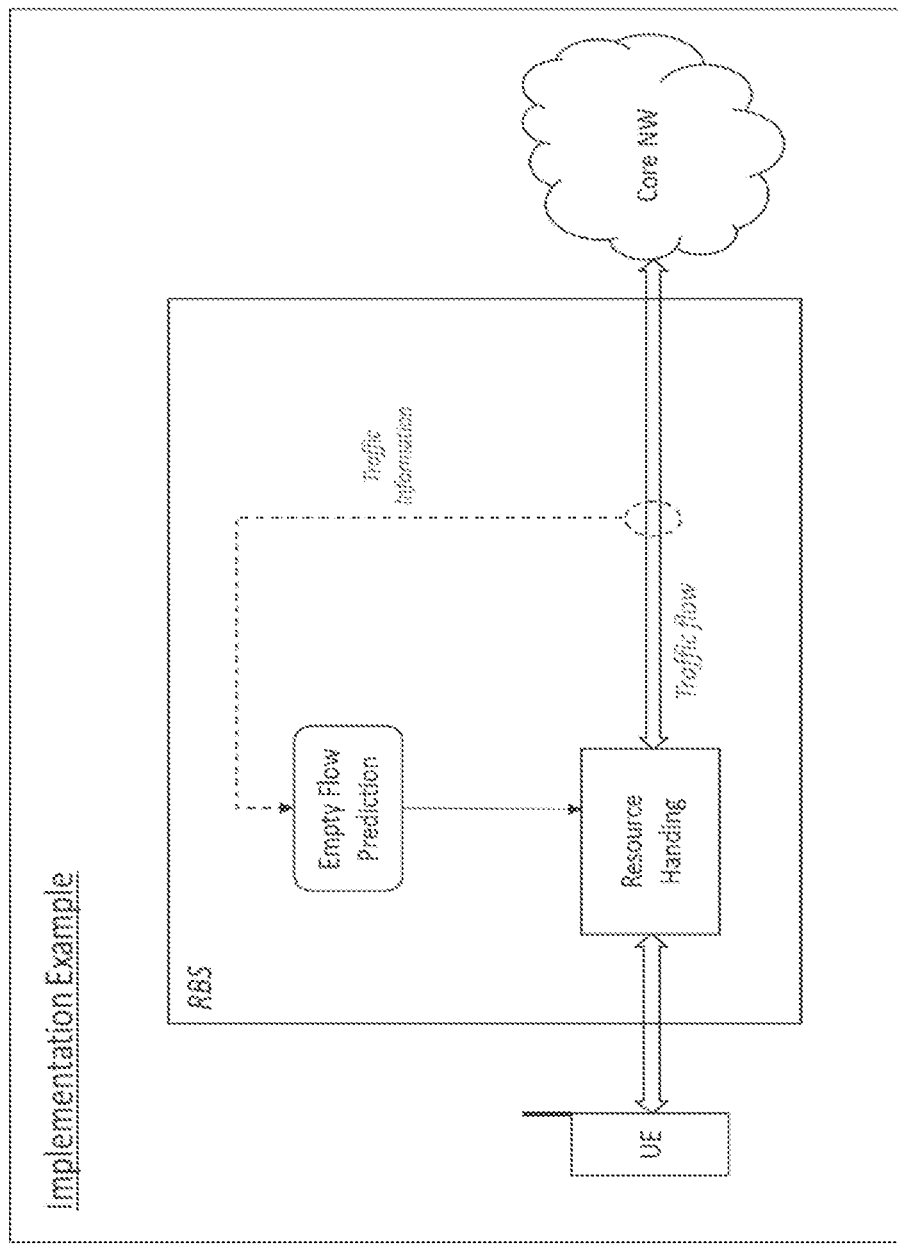
FIG. 4 is a schematic block diagram illustrating embodiments implemented in a network node.

Methods according to embodiments herein may be performed by the network node 110. As an alternative, a Distributed Node DN and functionality, e.g. comprised in a cloud 140 as shown in FIG. 4 may be used for performing or partly performing the methods.

Example embodiments herein relate to predicting empty flows, i. e. no more data at all to be transmitted for the first UE 121 in the connection with the network node 110. The probability of any empty flow prediction which may be seen as a positive prediction, i.e. the model believes with some certainty that this is an empty flow, in relation with the dynamic thresholds may then be used to determine action. See some examples below:

For the first UE 121 with additional radio resources, the network node 110 gets a prediction referred to as an empty flow prediction of low probability, e.g. 55%, and the data traffic load condition is such that all additional radio resources are demanded, a threshold referred to as a probability threshold is determined to a probability of 50%. This results in initiating a removal the additional radio resources from the first UE 121. This is since the prediction of 55% exceeds the threshold being 50%.

in another example, for the first UE 121 with additional radio resources, the network node 110 gets an empty flow predicted with low probability, e.g. 65% with a "send to Discontinuous Reception (DRX)" threshold of 60%. This results in initiating a removal the additional radio resources by sending the first UE 121 to DRX. This is since the prediction of 65% exceeds the threshold being 60%.

If the predicted probability would be higher, e.g. 75%, this may result in initiating a removal the additional radio resources by initiating out of synchronisation.

For real high probability, say 95%, this may result in initiating a removal the additional radio resources by disconnect the first UE 121.

All levels also in relation with thresholds that may be dynamically varied according to "environmental conditions", like cell load and data traffic load in the network node 110. Then the timing dynamics—how often the prediction is performed—as yet another variable.

Figure 2:
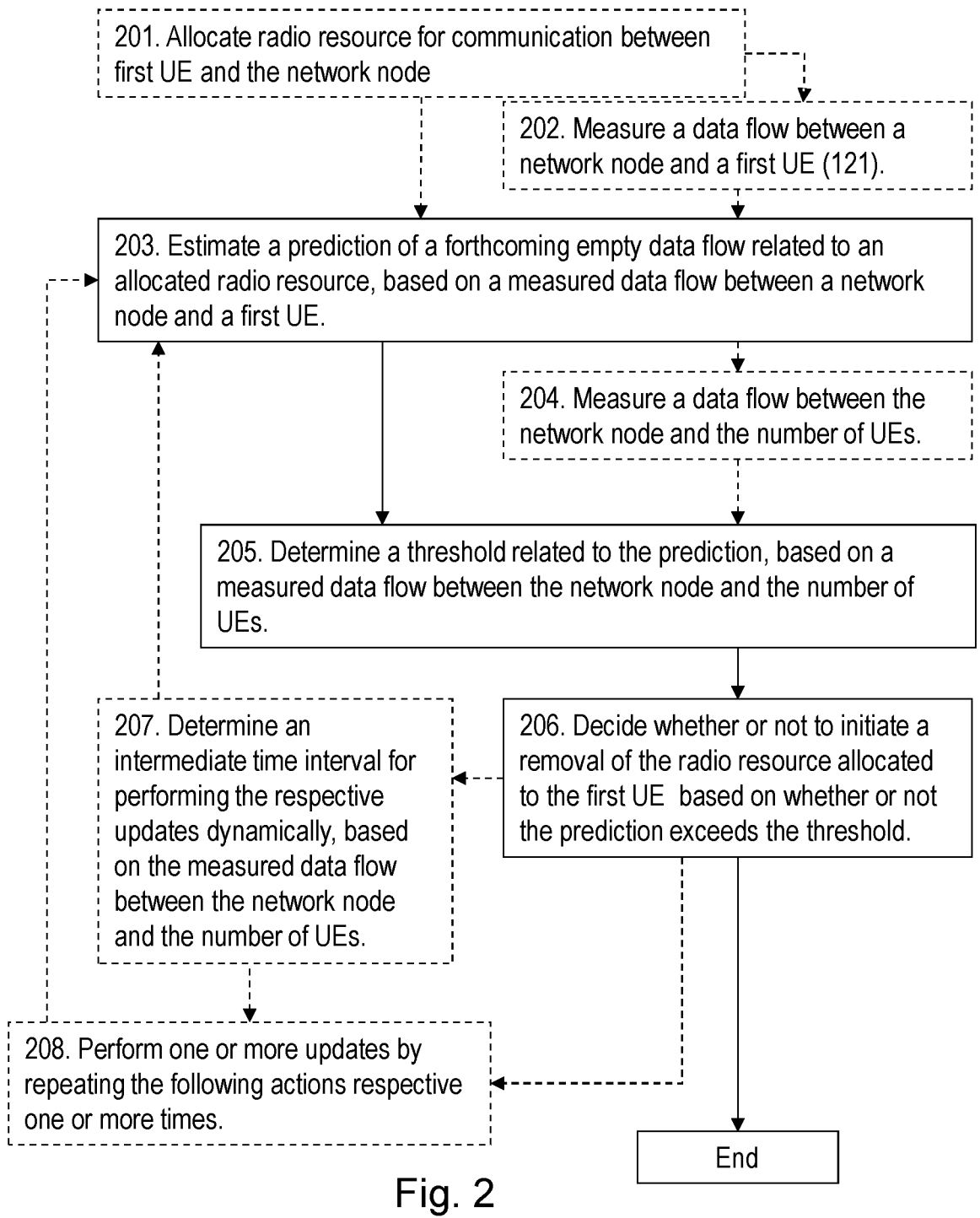
FIG. 2 is a flowchart depicting embodiments of a method in a network node.

Example embodiments of a method performed by a network node 110 for managing a radio resource between the network node 110 and the first UE 121 in the wireless communications network 100, will now be described with reference to a flowchart depicted in FIG. 2. The network node 110 serves a first UE 121 and one or more second UEs 122. The network node may comprise an ML model e.g. an ML model module.

The method comprises the following actions, which actions may be taken in any suitable order. Actions that are optional are presented in dashed boxes in FIG. 2.

Action 201

In an example scenario the first UE 121 has data to send or receive and therefore has been allocated a radio resource from the network node 110 and have access the wireless communications network 100. Thus, a radio resource is allocated for communication between the first UE 121 and the network node 110.

Action 202

In order to handle the radio resources provided by the network node 110 efficiently according to embodiments herein, the network node 110 needs to form an opinion about how the first UE 121 uses its allocated radio resource. This is will be used later on to predict the forthcoming empty data flow related to the allocated radio resource of the first UE 121. The network node 110 therefore e.g. measures the data traffic between the network node 110 and the first UE 121. The measure may e.g. comprise signalling, total data volume in either direction, the total service time for the connection between the first UE 121 and the network node 110, or the time to the next data burst. This action may not be performed, may be performed or may partly be performed by the ML model, depending on how the ML model is defined.

Action 203

The network node 110 estimates a prediction of a forthcoming empty data flow related to the allocated radio resource, based on the measured data flow between the network node 110 and the first UE 121. This action may be performed by the ML model which is described more in detail below.

The wording data flow related to the allocated radio resource when used herein means the data transmitted or to be transmitted between the network node 110 and the first UE 121 utilizing the mentioned radio resource.

The wording empty data flow when used herein means a connection between the network node 110 and the first UE 121 where no further data is or will be transmitted at all.

The wording forthcoming empty data flow when used herein means a connection between the network node 110 and the first UE 121 where no further data will be transmitted at all over a certain time span, e.g. the rest of the connection.

Action 204

In order to handle the radio resources provided by the network node 110 even more efficiently according to embodiments herein, the network node 110 needs to form an opinion about the available resources provided by the network node 110. It may be assumed that the network node 110 provides a limited radio resource pool. In situations wherein a large number of UEs comprising the first UE and the one or mere second UEs 122, communicates with the network node 110, results in a high data traffic load demanding a lot of the radio resources provided by the network node 110. Vice versa, a small number of UEs comprising the first UE and the one or mere second UEs 122 results in a low data traffic load demanding only a little of the radio resources provided by the network node 110. Even few UEs may put a high load on the network if the demand is high enough. The network node 110 may thus measure a data traffic load between the network node 110 and the number of UEs 121, 122. This action may not be performed, may be performed or may partly be performed by the ML model, depending on how the ML model is defined.

The wording data traffic load when used herein may e.g. comprise: Available radio resources in the network node 110 i.e. radio resources not used at the moment, quantity of used radio resources in the network node 110 i.e. radio resources that are used at the moment, data traffic pattern of the one or more second UEs 122, the number of connected UEs, the mobility activity i.e. the intensity of handovers, and the total data traffic transmitted.

The data traffic load may be measured by keeping track of the connected devices such as the first UE 121 and one or more second UEs 122 and their activities, continuously collecting characteristics of the individually and aggregated transmitted traffic, e.g. directions, pattern, volumes, timing information and statistics for the transmitted data entities.

Action 205

In order to handle the allocated radio resources dynamically according to embodiments herein, the network node 110 decides a threshold, e.g. a limit, based on the current data traffic load. The threshold shall be used to dynamically decide whether or not to initiate a removal of the radio resource allocated to the first UE 121. Thus the network node 110 determines a threshold related to the prediction, based on, e.g. as a function of, the measured data flow between the network node 110 and the number of UEs 121, 122. This action may be performed by the ML model.

In some embodiments, the threshold is represented by a probability value related to the prediction of the forthcoming empty data flow of the allocated radio resource e.g. the probability that the first UE 121 is an empty flow UE.

According to embodiments herein, the threshold may be determined for each UE communicating with radio resources from the radio network node 110. However, according to embodiments herein, the threshold is determined dynamically and may be changed from time to time. E.g. at a certain data traffic load the threshold such as e.g. the probability limit, for predicting empty flow may be determined to 70%. Further, in a really demanding data traffic load situation the threshold for predicting empty data flow e.g. probability limit for-an empty flow UE may be determined to be 50%. According to embodiments herein the dynamically determined threshold allows for a much better accuracy when deciding whether or not to initiate a removal of the radio resource allocated to the first UE 120, leading to that almost all scarce radio resources are allocated to the UEs that really need them, e.g. the UEs that has data to send. In an example scenario the UEs with most data to send are prioritized since this will yield the highest positive impact on user experience.

This action of determining the threshold related to the prediction, based on a measured data traffic load between the network node 110 and the number of UEs 121, 122 may comprise determining the threshold related to the prediction, as a function of the measured data traffic load between the network node 110 and the number of UEs 121, 122. This e.g. means that when the traffic load increases, the threshold increases.

Action 206

The network node 110 then decides whether or not to initiate a removal of the radio resource allocated to the first UE 120 based on whether or not the prediction exceeds the threshold. This action may not be performed, may be performed or may partly be performed by the ML model, depending on how the ML model is defined.

In some embodiments, and when deciding to not initiate a removal of the radio resource allocated to the first UE 120 may comprise deciding to let the radio resource remain to be allocated to the first UE 120.

In some embodiments, and when deciding to initiate a removal of the radio resource allocated to the first UE 120 may comprise any one out of:

Deciding to remove the radio resource allocated to the first UE 120. This may be performed by e.g. removing any additional resources allocated to the first UE 120.

Deciding to let the first UE 120 go in power saving mode. This may be performed by e.g. moving the first UE 120 to the out-of-sync state or moving the first UE 120 to DRX state.

And deciding to release the first UE 120 from the wireless communications network 100. This may be performed by e.g. terminating the connection between the first UE 120 and the network 100.

According to an example scenario the threshold is decided to be 70%. If the result of the estimated prediction is a probability value of 90%, that the first UE 121 has a forthcoming empty data flow, this means that the prediction of 90% exceeds the threshold that is 70%. The first UE 121 is therefore decided to be initiated for a removal of the allocated radio resource. If the result of the estimated prediction has a probability value of 50%, that the first UE 121 has a forthcoming empty data flow of the allocated radio resource, this means that the prediction of 50% do not exceed the threshold that is 70%. The first UE 121 is therefore decided to not be initiated for a removal of the allocated radio resource. This may then e.g. mean that all resources allocated to the first UE 121 are maintained.

Action 207

In some embodiments, respective updates will be performed with an intermediate time interval e.g. when decided to not initiate a removal of the radio resource allocated to the first UE 121. In these embodiments, the network node 110 may determine the intermediate time interval for performing the respective updates dynamically as a function of the measured data flow between the network node 110 and the number of UEs 121, 122. This action may be performed by the ML model.

Action 208

E.g., when decided to not initiate a removal of the radio resource, the network node 110 performs one or more updates by repeating the following actions, as are described above, respective one or more times: Estimating 203 a prediction of a forthcoming empty data flow related to the allocated radio resource, based on a measured data flow between the network node 110 and the first UE 121, determining 205 a threshold related to the prediction, based on a measured data flow between the network node 110 and the number of UEs 121, 122, and deciding 206 whether or not to initiate a removal of the radio resource allocated to the first UE 120 based on whether or not the prediction exceeds the threshold. This action may be performed by the ML model Embodiments herein such as mentioned above will now be further described and exemplified. The text below is applicable to and may be combined with any suitable embodiment described above.

As an example of how embodiments herein may be used, a use case is considered with the network node 110 which e.g. is a Radio Base Station (RBS), mobile end users such as the first UE 121 and the second UEs 122, and a limited resource pool in the RBS. The pooled resources may be utilized by a limited number of UEs to enhance their individual performance, e g the Bandwidth (BW), but each resource may only be utilized by a single UE such as e.g. the first UE 121. As a varying execution environment condition, the data traffic load in the network node 110 is used to determine how the resources are best distributed, i e how to find the UEs with for example, but not limited to, the lowest BW requirements, also referred to as the UE with the lowest BW demands, the network node 110 such as an ML model executing in the network node 110 may be implemented to handle the prediction of empty flows. It is assumed that the individual cost for the first UE 121 to utilize the resource is low, i e no tangible cost on battery or any other UE associated resource. In the example the non-granted users may still have access but at a lower capability level.

The network node 110 such as the ML model in empty flow predicting executing in the network node 110 will predict which UE data flows such as the data flow in the first UE 121 will have no more activity and which will have more data to send or receive. For example, if the data flow for the first UE 121 is predicted to have additional activity, the first UE 121 is granted capacity from the limited radio resource pool, as long as there are any available radio resources left. This means that the radio resource pool may not always be fully utilized, but that the radio resource utilization from the granted UEs will be high.

If the data flow for the first UE 121 is predicted to have no additional activity, i.e. an empty data flow, the radio resource is forfeited and is no longer granted to the first UE 121. It may include data resources in the first UE 121. This means that depending e.g. on the probability of the empty flow prediction different actions may be initiated, also related to the thresholds which are dynamically set according to the environmental conditions, e.g. the traffic load. The first UE 121 may even be released from the wireless communications network. This mechanism may also lead to the radio resource pool not being fully utilized at all times, but also that the individual resource utilization is high.

In a situation with low traffic load in the network node 110, a possible strategy for the empty flow prediction is for the first UE 121 to keep its allocated radio resources and not release the first UE 121. The network node 110 may or may not decide to move the first UE 121 to power saving mode which may be of benefit for the user of the first UE 121.

As the data traffic load in the network node 110 increases the pooled radio resources in the network node 110 start to get scarce, and thereby the importance of a correct prediction of empty flows may be impacted. In embodiments herein the first threshold, which is referred to as the limit in the example, in the ML model to predict high or low BW for a UE is dynamic. As mentioned above an example of a the first threshold is the probability of the prediction. In one prior art example, if the probability is higher than e g 90%, empty data flow is always predicted since the limit is fixed. However, according to embodiments herein, these limits are determined dynamically, and may therefore be dynamically changed, e g at a certain data traffic load at network node 110, the first threshold, e.g. the probability limit, for predicting empty data flow may be decided to and/or be changed to e.g. 80%. And in a really demanding data traffic load situation the threshold such as the probability limit for empty flow may be decreased to 60% and the intermediate time interval between empty flow predictions may be shortened leading to almost all scarce resources are allocated to the UEs that really need them.

As the load decreases the threshold may be tightened and the intermediate time interval between new empty data flow predictions may be extended. The word tightened when used herein means increased in such a way that the prediction should be more certain that this really is an empty flow. These dynamic determinations of the threshold and intermediate time intervals may be gradually following the steering characteristic such as the data traffic load in the network node 110, without any hard steps, e.g. determined as a function of the data traffic load in the network node 110. This allows for optimal performance in any situation.

The mechanism of give and remove allocated radio resources to a user depending on the predicted empty data flow allows for a flexible granting scheme that follows a UE's varying traffic pattern, for example throughput burstiness.

Figure 3:
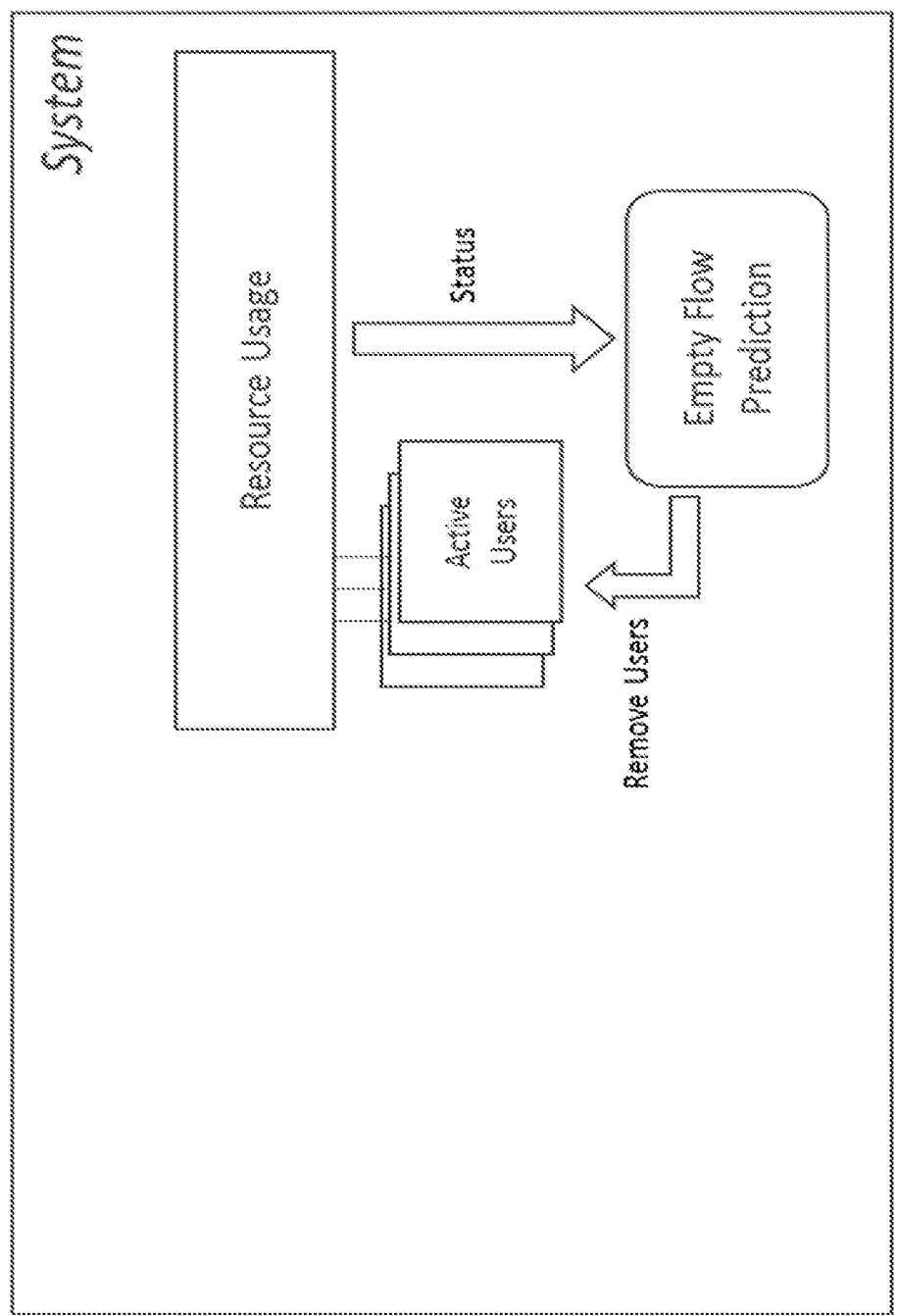
FIG. 3 is a schematic block diagram illustrating embodiments implemented in a network node.

FIG. 3 is a block diagram that in a schematic way shows how the empty data flow prediction works in a system such as the wireless communications network 100. The data flow is referred to as flow in FIG. 3. UEs, referred to as Users in FIG. 3, such as the first UE 121, have been allocated radio resources referred to as resource usage in FIG. 3. The network node 110 predicts the activity of the UEs 121, 122 such as the data flow, to be empty or not and resources may be removed if the data flow is predicted to be inactive such as empty. The network node 110 decides whether or not to initiate a removal of the radio resource allocated to the first UE 120 based on whether or not the prediction exceeds the threshold. In cases where the allocated radio resource is kept, the network node 110 such as its empty flow predictor may remove the allocated resources for these users at a later time with dynamic time intervals between these decisions.

FIG. 4 is a block diagram that in a schematic way shows an example of how embodiments herein may be implemented and used, such that e.g. the radio resources remains allocated to the UEs that can make best use of them. The data traffic flow of the first UE 121, is measured e.g. referred to as traffic information, which will be an input to the Empty flow prediction. The data traffic flow to and from the network node e.g. to the core network (NW), may continuously be monitored, and the network node 110 e.g. by means of ML Models in the empty flow predictor, predicts whether the first UE 121 will have any more activity or not such as have an empty flow or not, for example, the network node 110 may then e.g. by means of the ML Model estimate the prediction of a forthcoming empty data flow related to an allocated radio resource, based on a measured data traffic between the network node 110 and the first UE 121. The network node 110 then decides whether or not to initiate a removal of the radio resource allocated to the first UE 121 based on whether or not the prediction exceeds the threshold. This may e.g. be performed in the resource handling. The radio resource in the network node 110 may e.g. remain to be allocated to the first UE 121, or the radio resource may be removed from the first UE 121, the first UE 121 may go in power saving mode or the first UE 121 may be released from the radio communications network 100.

Figure 5:
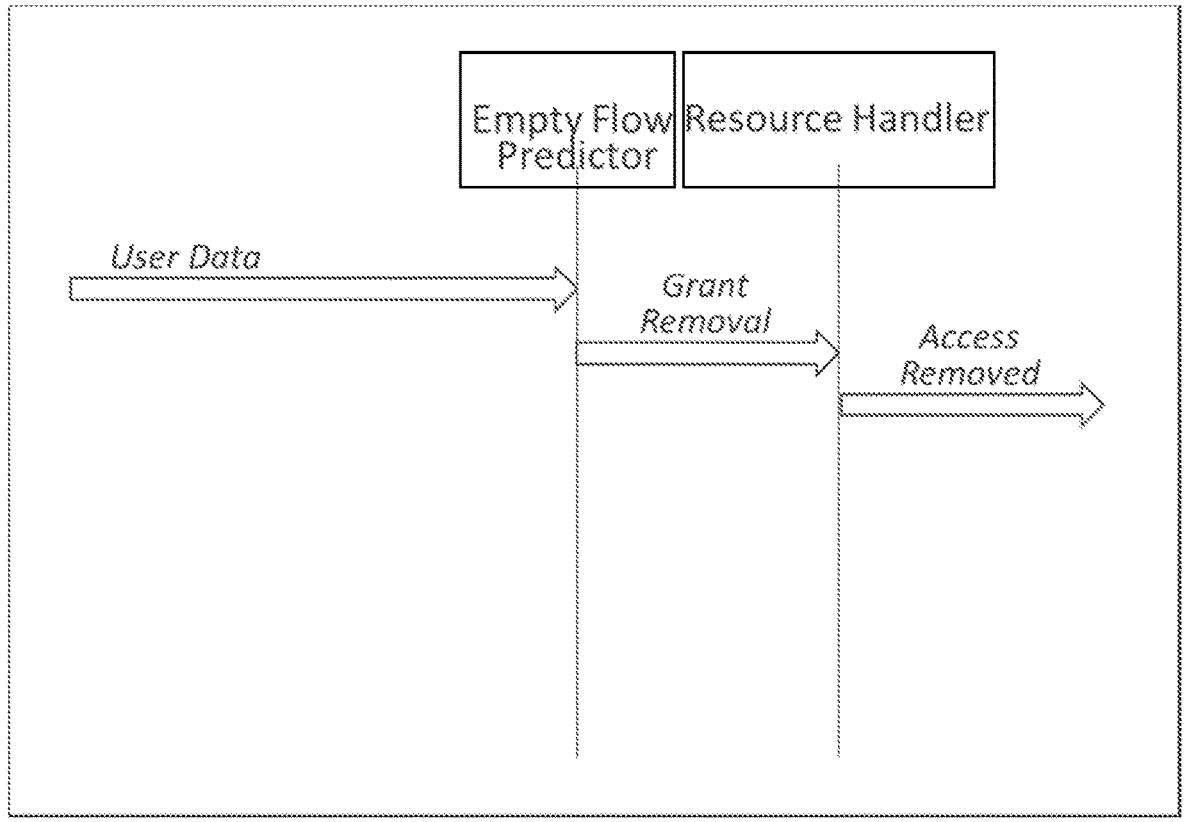
FIG. 5 is a signaling diagram illustrating embodiments herein.

FIG. 5 is a sequence diagram that in a schematic way illustrates a signaling flow within an ML model module residing in the network node 110 according to an example embodiment. User Data also referred to as data flow, is measured and presented to the empty flow predictor, such as e.g. the threshold is determined based on measured data traffic load of the UEs 121, 122. The network node 110 such as the empty flow predictor then decides whether or not to initiate a removal of the radio resource allocated to the first UE 121 based on whether or not the prediction exceeds the threshold. E.g. the empty flow predictor sends a Grant Removal signal to the Resource Handler when it is decided to initiate a removal of the radio resource allocated to the first UE 121. This e.g. results in a decision by the Resource Handler to remove the resources and signal Access Removed as a monitor signal to the first UE 121 if requested. This process may be repeated with dynamic time intervals.

Figure 6:
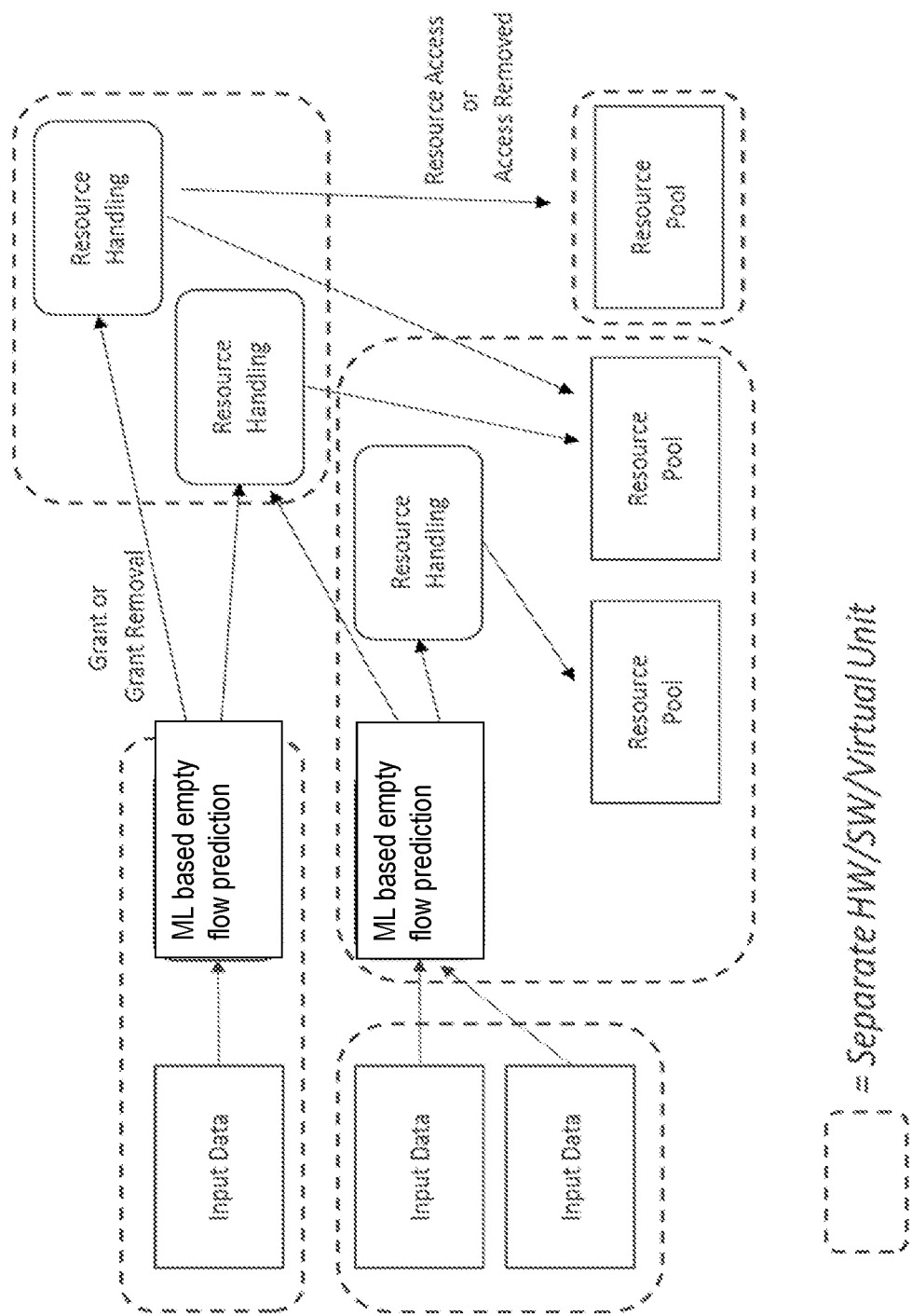
FIG. 6 is a schematic block diagram illustrating embodiments implemented in a wireless communications network.

Embodiments herein work well in a distributed computing environment, and any of the building blocks may be implemented on a separate Hard Ware (HW) unit or server, or as a separate thread or process in any operating system environment, or as a virtual block executing in a cloud configuration. FIG. 6 shows an example scenario of how the included parts may be configured to operate over separate HW/Soft Ware (SW)/Virtual units.

Figure 7:
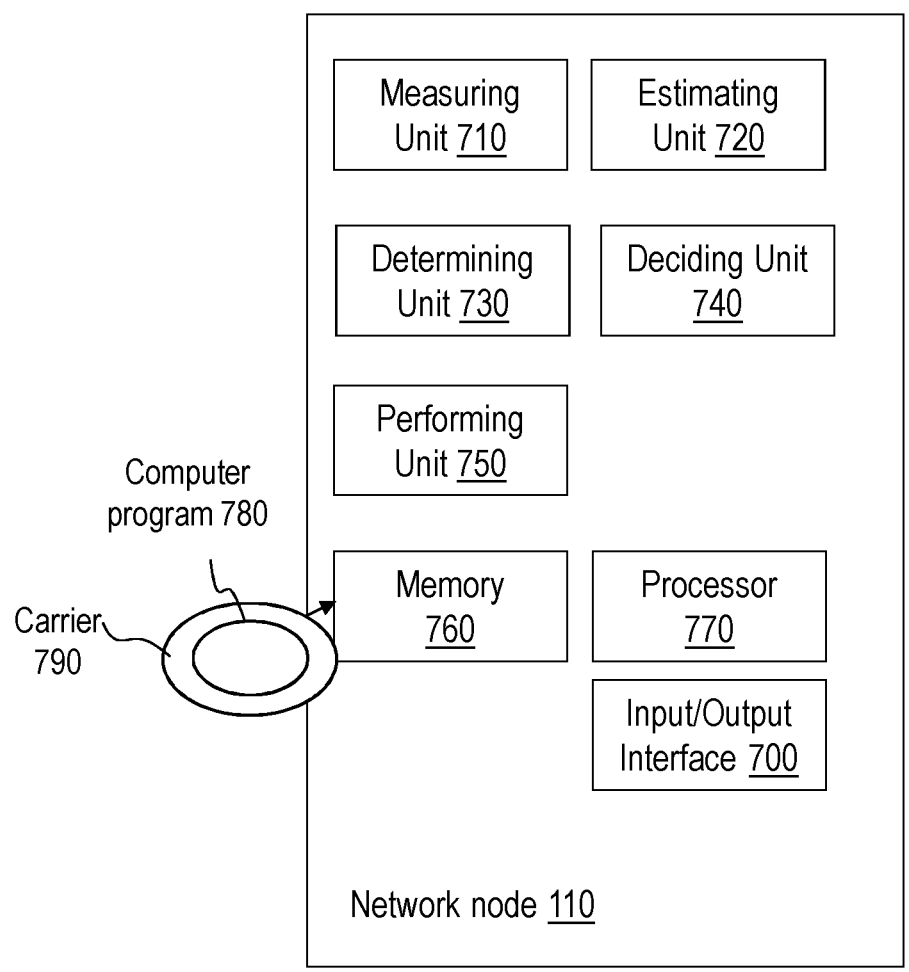
FIG. 7 is a schematic block diagram illustrating embodiments of a network node.

To perform the method actions for managing a radio resource between a network node 110 and a first UE 121 in a wireless communications network 100, the network node 110 may comprise the arrangement depicted in FIG. 7. As mentioned above, the network node 110 is adapted to serve a number of UEs 121, 122 comprising the first UE 121 and one or more second UEs 122, where the first UE 120 is adapted to have a radio resource allocated for communication between the first UE 121 and the network node 110.

The network node 110 may comprise an input and output interface 700 configured to communicate e.g. with the network node 110. The input and output interface 1100 may comprise a wireless receiver (not shown) and a wireless transmitter not (shown).

The network node 110 may in some embodiments be configured to, e.g. by means of a measuring unit 710 comprised in the network node 110, any one or more out of: measure a data flow between the network node 110 and the and the first UE 121, and measure a data flow between the network node 110 and the number of UEs 121, 122, The network node 110 is further configured to, e.g. by means of an estimating unit 720 comprised in the network node 110, estimate a prediction of a forthcoming empty data flow related to the allocated radio resource, based on a measured data flow between the network node 110 and the first UE 121.

The network node 110 is further configured to, e.g. by means of a determining unit 730 comprised in the network node 110, determine a threshold related to the prediction, based on a measured data flow between the network node 110 and the number of UEs 121, 122. In some embodiments the threshold is adapted to be represented by a probability value related to the prediction of the forthcoming empty data flow related to the allocated radio resource.

The network node 110 is further configured to, e.g. by means of a deciding unit 740 comprised in the network node 110, decide whether or not to initiate a removal of the radio resource allocated to the first UE 120 based on whether or not the prediction exceeds the threshold.

The network node 110 may further be configured to decide, e.g. by means of the deciding unit 740, to not initiate a removal of the radio resource allocated to the first UE 120 by: decide to let the radio resource remain to be allocated to the first UE 120.

The network node 110 may further be configured to, by e.g. means of the deciding unit 740, decide to initiate a removal of the radio resource allocated to the first UE 120 by any one out of: decide to remove the radio resource allocated to the first UE 120, decide to let the first UE 120 go in power saving mode, and decide to release the first UE 120 from the wireless communications network 100.

The network node 110 may further be configured to, e.g. by means of a performing unit 750 comprised in the network node 110, when decided to not initiate a removal of the radio resource: perform one or more updates by repeating the following actions respective one or more times:

e.g. by means of the estimating unit 1120, estimate a prediction of a forthcoming empty data flow related to the allocated radio resource, based on a measured data flow between the network node 110 and the first UE 121, and e.g. by means of the determining unit 1130, determine a threshold related to the prediction, based on a measured data flow between the network node 110 and the number of UEs 121, 122, and e.g. by means of the deciding unit 1140, decide whether or not to initiate a removal of the radio resource allocated to the first UE 120 based on whether or not the prediction exceeds the threshold.

The network node 110 may further be configured to perform the respective updates with an intermediate time interval, where the network node 110 is further configured to: e.g. by means of the determining unit 1130, determine an intermediate time interval for performing the respective updates dynamically, based on the measured data flow between the network node 110 and the number of UEs 121, 122.

The embodiments herein may be implemented through a respective processor or one or more processors, such as a processor 770 of a processing circuitry in the network node 110 depicted in FIG. 11, together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 760 comprising one or more memory units. The memory 1160 comprises instructions executable by the processor 1170 in the network node 110. The memory 1160 is arranged to be used to store e.g. data, configurations, thresholds, predictions, determined intermediate time intervals, measurements, and applications to perform the methods herein when being executed in the network node 110.

In some embodiments, a respective computer program 780 comprises instructions, which when executed by the respective at least one processor 1170, cause the at least one processor 1170 of the network node 110 to perform the actions above.

In some embodiments, a respective carrier 790 comprises the respective computer program 1190, wherein the carrier 1180 is one of an electronic signal, an optical signal, an electromagnetic signal, a magnetic signal, an electric signal, a radio signal, a microwave signal, or a computer-readable storage medium.

Those skilled in the art will also appreciate that the units in the network node 110 mentioned above may refer to a combination of analog and digital circuits, and/or one or more processor configured with software and/or firmware, e.g. stored in the network node 110 that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 8:
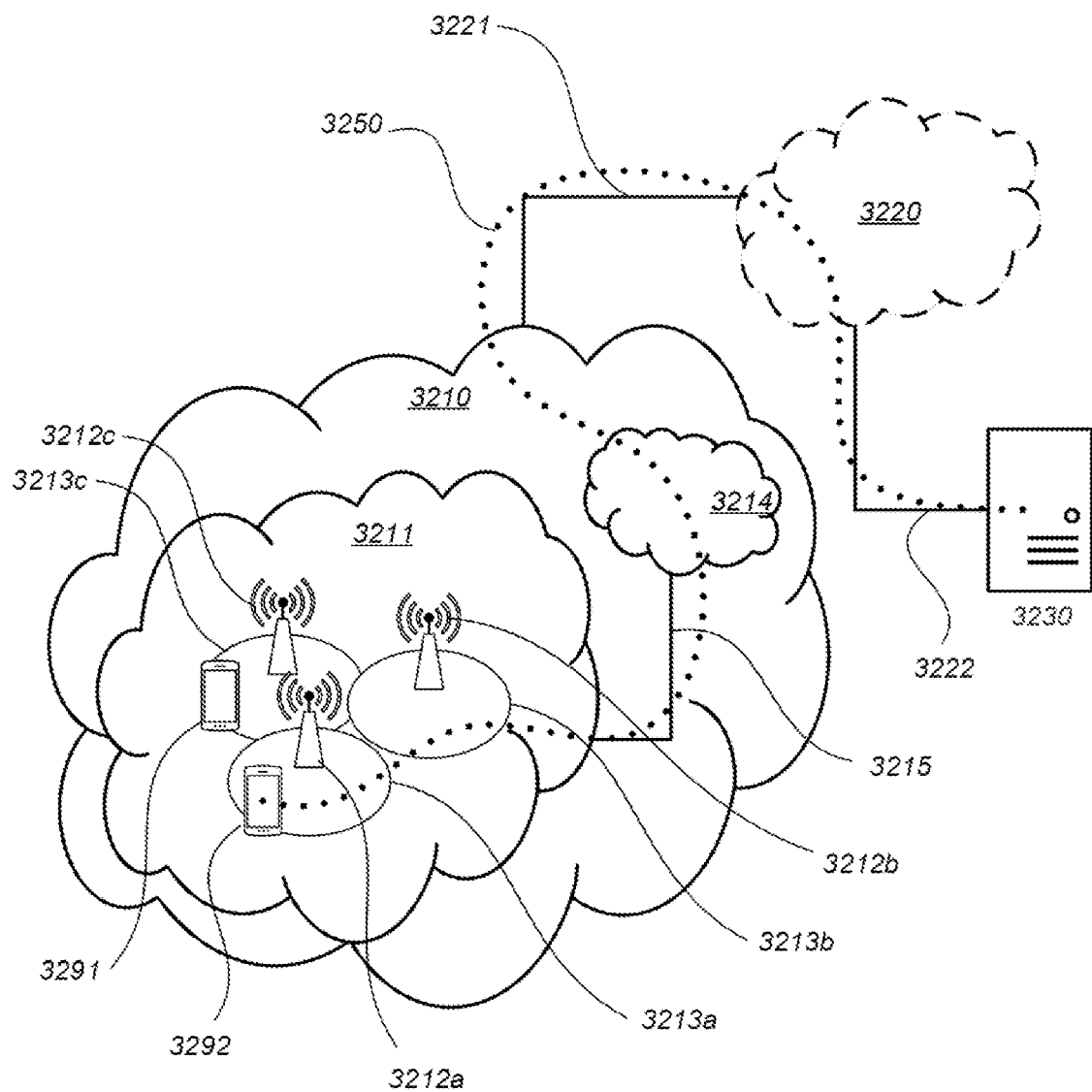
FIG. 8 schematically illustrates a telecommunication network connected via an intermediate network to a host computer.

Further Extensions and Variations With reference to FIG. 8, in accordance with an embodiment, a communication system includes a telecommunication network 3210 such as the wireless communications network 100, e.g. a NR network, such as a 3GPP-type cellular network, which comprises an access network 3211, such as a radio access network, and a core network 3214. The access network 3211 comprises a plurality of base stations 3212a, 3212b, 3212c, such as the network node 110, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the wireless device 122 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 9. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 9) served by the base station 3320. The communication interface 3326 may be configured to facilitate a connection 3360 to the host computer 3310. The connection 3360 may be direct or it may pass through a core network (not shown in FIG. 9) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 9 may be identical to the host computer 3230, one of the base stations 3212a, 3212b, 3212c and one of the UEs 3291, 3292 of FIG. 8, respectively. This is to say, the inner workings of these entities may be as shown in FIG. 9 and independently, the surrounding network topology may be that of FIG. 8.

Figure 9:
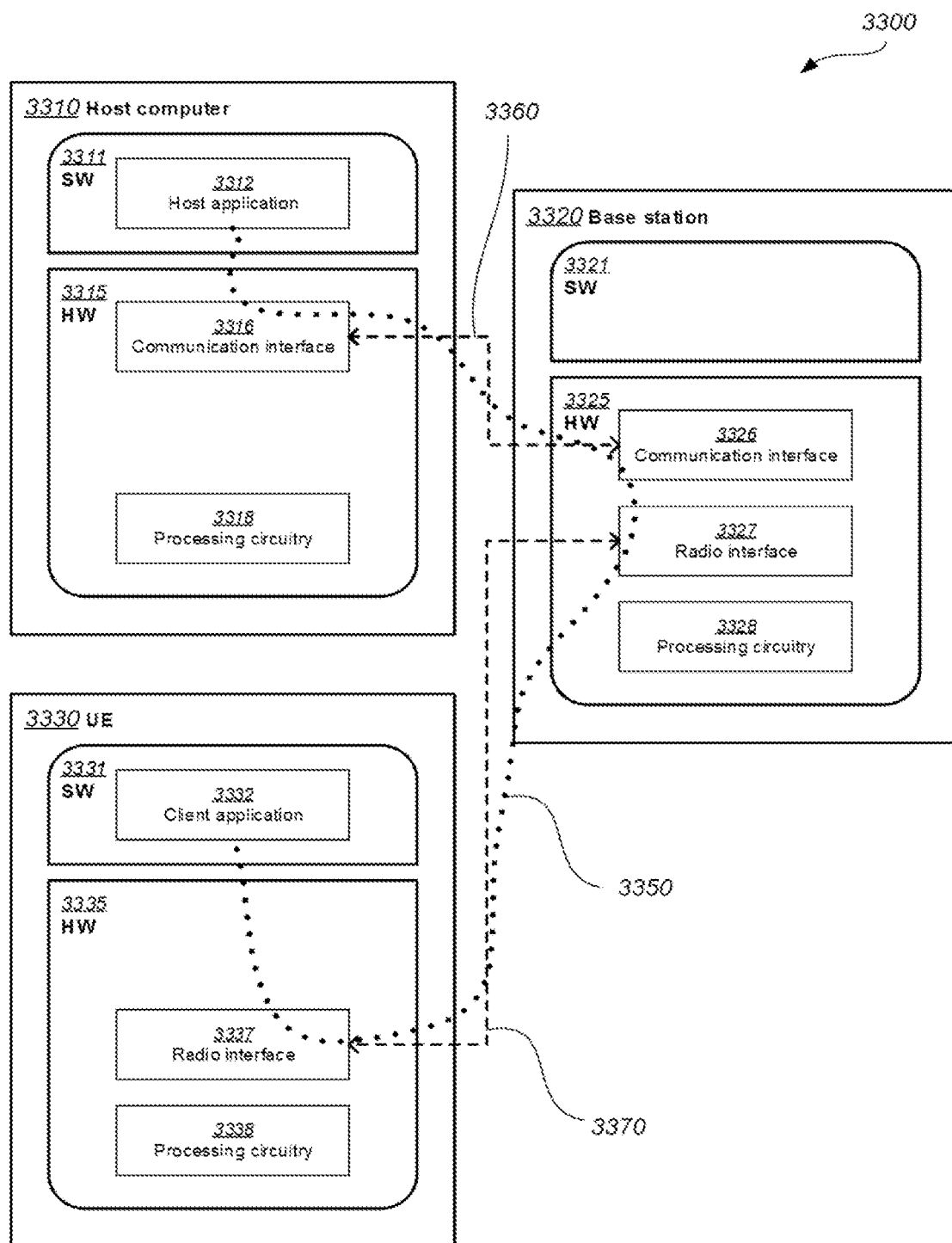
FIG. 9 is a generalized block diagram of a host computer communicating via a base station with a user equipment over a partially wireless connection.

In FIG. 9, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 10 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 10 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 11 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 11 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 12 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 12 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 13 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a network node for managing a radio resource between the network node and a first User Equipment (UE) in a wireless communications network, which network node serves a number of UEs comprising the first UE and one or more second UEs, and wherein the first UE has a radio resource allocated for communication between the first UE and the network node, the method comprising:
   based on a measured data flow between the network node and the first UE, determining a first probability that a data flow related to the allocated radio resource is an empty data flow;
   based on a measured data flow between the network node and the number of UEs, determining a first probability threshold; and
   deciding whether or not to initiate a removal of the radio resource allocated to the first UE based on whether or not the determined first probability exceeds the first probability threshold.

2. The method of claim 1, wherein the first probability threshold is represented by a probability value.

3. The method of claim 1, further comprising any one or more out of:
   measuring a data flow between the network node and the first UE, or
   measuring a data flow between the network node and the number of UEs.

4. The method of claim 1,
further comprising performing an update procedure that comprises:
   determining a second probability that the data flow related to the allocated radio resource is an empty data flow;
   determining a second probability threshold; and
   deciding whether or not to initiate a removal of the radio resource allocated to the first UE based on whether or not the determined second probability exceeds the second probability threshold.

5. The method of claim 4, further comprising:
   based on the measured data flow between the network node and the number of UEs, determining a time at which to perform the update procedure.

6. The method of claim 1, wherein deciding to not initiate a removal of the radio resource allocated to the first UE comprises deciding to let the radio resource remain to be allocated to the first UE.

7. The method of claim 1, wherein deciding to initiate a removal of the radio resource allocated to the first UE comprises any one out of:
   deciding to remove the radio resource allocated to the first UE,
   deciding to let the first UE go in power saving mode, or
   deciding to release the first UE from the wireless communications network.

8. The method of claim 7, wherein deciding to initiate a removal of the radio resource allocated to the first UE comprises:
   deciding to remove the radio resource allocated to the first UE, or
   deciding to let the first UE go in power saving mode.

9. A computer program product comprising a non-transitory computer readable medium storing a computer program comprising instructions, which when executed by a processor, causes the processor to perform the method of claim 1.

10. A network node for managing a radio resource between the network node and a first User Equipment (UE) in a wireless communications network, which network node is adapted to serve a number of UEs comprising the first UE and one or more second UEs, and wherein the first UE is adapted to have a radio resource allocated for communication between the first UE and the network node, the network node comprising:
   memory; and
   processing circuitry coupled to the memory, wherein the network node is configured to:
   based on a measured data flow between the network node and the first UE, determine a first probability that a data flow related to the allocated radio resource is an empty data flow;
   based on a measured data flow between the network node and the number of UEs, determine a first probability threshold; and
   decide whether or not to initiate a removal of the radio resource allocated to the first UE based on whether or not the determined first probability exceeds the first probability threshold.

11. The network node of claim 10, wherein the first probability threshold is adapted to be represented by a probability value.

12. The network node of claim 10, the network node being configured to, any one or more out of:
- measure a data flow between the network node and the and the first UE, or
- measure a data flow between the network node and the number of UEs.

13. The network node of claim 10,
wherein the network node is configured to perform an update procedure as a result of deciding not to initiate the removal of the radio resource, wherein the update procedure comprises:
- determining a second probability that the data flow related to the allocated radio resource is an empty data flow;
- determining a second probability threshold; and
- deciding whether or not to initiate a removal of the radio resource allocated to the first UE based on whether or not the determined second probability exceeds the second probability threshold.

14. The network node of claim 13,
wherein the network node is further configured to, based on the measured data flow between the network node and the number of UEs, determine a time at which to perform the update procedure.

15. The network node of claim 10, wherein the network node is further configured to decide to not initiate a removal of the radio resource allocated to the first UE by:
- decide to let the radio resource remain to be allocated to the first UE.

16. The network node of claim 10, wherein the network node is further configured to decide to initiate a removal of the radio resource allocated to the first UE by any one out of:
- decide to remove the radio resource allocated to the first UE,
- decide to let the first UE go in power saving mode, or
- decide to release the first UE from the wireless communications network.

* * * * *